United States Patent [19]

Bennett

[11] 4,384,338
[45] May 17, 1983

[54] METHODS AND APPARATUS FOR BLENDING COMPUTER IMAGE GENERATED FEATURES

[75] Inventor: William S. Bennett, Chenango Bridge, N.Y.

[73] Assignee: The Singer Company, Binghamton, N.Y.

[21] Appl. No.: 219,643

[22] Filed: Dec. 24, 1980

[51] Int. Cl.³ .......................... G06F 3/153; H04N 7/18
[52] U.S. Cl. ................................. 364/522; 340/729; 358/104; 434/43
[58] Field of Search ................ 364/522; 358/103, 104, 358/109; 340/705, 729; 434/38, 43, 47

[56] References Cited

U.S. PATENT DOCUMENTS

| | | | |
|---|---|---|---|
| 2,975,671 | 3/1961 | Hemstreet | 353/5 |
| 3,621,214 | 11/1971 | Romney et al. | 364/522 |
| 3,639,736 | 2/1972 | Sutherland | 364/723 |
| 3,643,345 | 2/1972 | Wilton et al. | 434/44 |
| 3,665,408 | 5/1972 | Erdahl et al. | 340/729 |
| 3,670,426 | 6/1972 | Horowitz | 434/38 |
| 3,826,864 | 7/1974 | Paufue | 358/104 |
| 3,889,107 | 6/1975 | Sutherland | 364/515 |
| 3,961,133 | 6/1976 | Bennett | 358/183 |
| 4,199,875 | 4/1980 | Barbarasch | 434/43 X |
| 4,297,691 | 10/1981 | Kodama et al. | 434/43 X |

*Primary Examiner*—Jerry Smith
*Attorney, Agent, or Firm*—Jeff Rothenberg; Douglas M. Clarkson

[57] ABSTRACT

Methods and apparatus for determining dynamically a blending ratio for blending features in a computer image generated scene are disclosed. The invention is for use with a computer image generation system which provides a dynamic scene as viewed by the pilot of an aircraft simulator. Such a computer image generator system includes a main data base (62) which contains information representing features of the scene to be presented, a display means (76) and a main computational unit (74) for generating the dynamic visual scene. Apparatus of the present invention includes a control data base (78) which contains selected information related to selected features contained within main data base (62). The selected information contained in control data base (78) includes the spatial coordinates of a control point of the selected feature, and the range at which the feature should be included. Also included in computational unit (74) is a means for determining the location of the central point on a theoretical image plane (61). Means such as CRT (92) which has a pie shaped cut out (98) works in conjunction with a light detector (100) and A/D convertor (106) to determine a proper blending ratio signal. This blending ratio signal is then provided to computational unit (74) to provide the blending of a new feature into the dynamic visual scene. Alternately, a read only memory (ROM) (108) could be used to replace CRT (92), photo detector (100) and A/D convertor (106).

8 Claims, 14 Drawing Figures

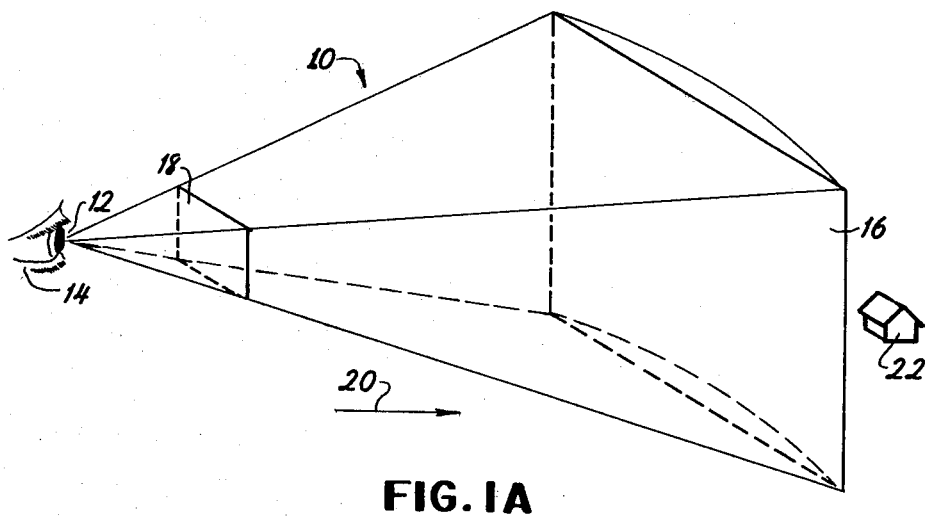
FIG. IA
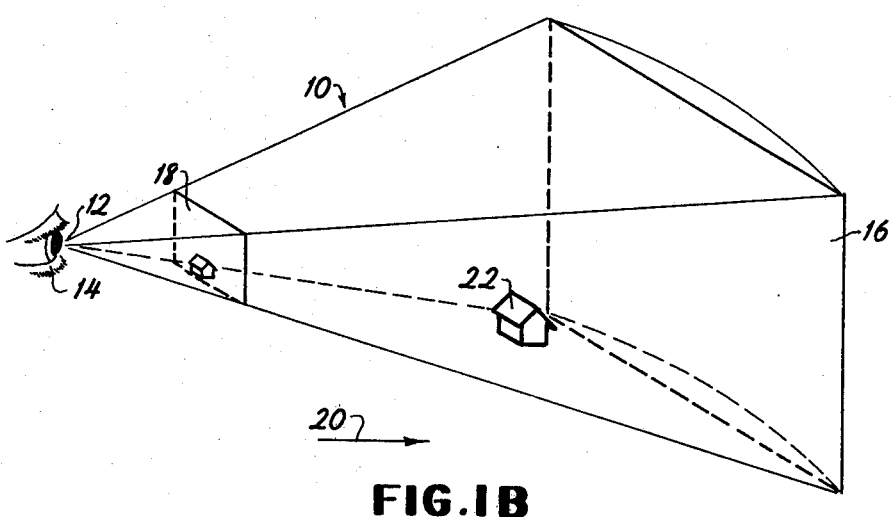
FIG. IB
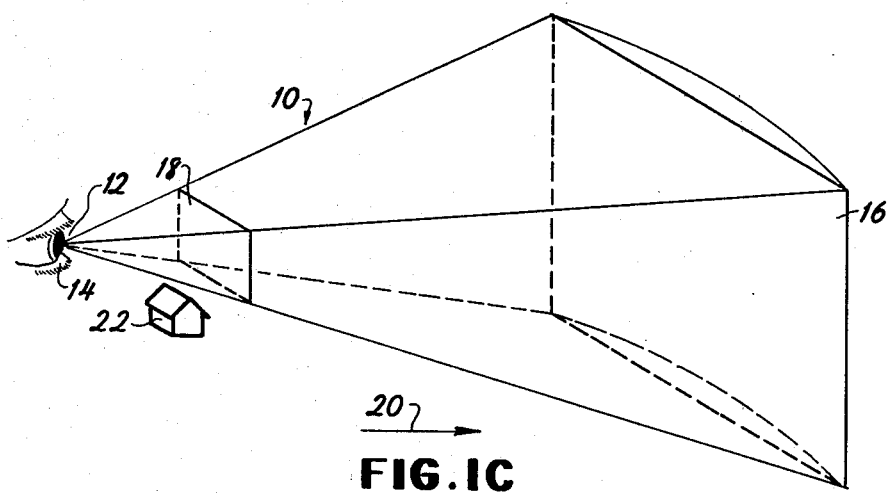
FIG. IC

METHODS AND APPARATUS FOR BLENDING COMPUTER IMAGE GENERATED FEATURES

TECHNICAL FIELD

This invention relates generally to computer image generated visual systems for vehicle simulators, and more particularly to methods and apparatus for blending features into a dynamic scene during the "flight" of a simulator. Specifically, this invention provides methods and apparatus for generating a blending signal for each new feature to be introduced into a dynamic scene so that the new feature does not suddenly "pop in" to the scene or scintillate in and out of the scene when it is first introduced.

BACKGROUND ART

As high performance aircraft become more and more complex, the need for more extensive and specialized training also increases. To obtain such training the student pilot must either be provided with actual training and experience in the aircraft which he is to pilot, or be provided training in a simulator of the aircraft. Training in the actual aircraft simply cannot be accomplished with respect to certain emergency procedures and maneuvers because of the dangers of the actual or real life environment. This is, of course, especially true for single pilot aircraft. Further, as fuel becomes more and more expensive, the time required to set up a training environment makes such training costs excessive even without considering the actual wear and tear of the aircraft. Consequently, because of the versatility, low operating costs, and lack of inherent dangers, aircraft simulation is being called upon to take over more and more of the aircraft training missions. However, to be truly effective, the aircraft simulator must faithfully represent or reproduce the environment that the trainee or student pilot would face in an actual flight.

Over a short period of time, flight simulators have developed from the early bellows driven Link trainers to todays highly sophisticated, computer controlled, flight/mission simulators. With ever increasing versatility and fidelity, todays simulators duplicate a broad spectrum of flight conditions and aircraft performance in both normal and malfunction modes. By employing the advanced motion systems, a multitude of digital computers, visual displays and the like, present day simulators are able to generate and integrate a multiplicity of realistic flight cues used to provide effective training for flight crew members. However, as will be appreciated by those familiar with the art of teaching, it has been found that the more senses of an individual that can be directed towards a problem, the faster and more thoroughly he learns. Thus, all cues that a pilot experiences in flying an aircraft must be properly and effectively simulated. Perhaps the most important cues that a pilot depends upon are visual cues. To this end, many if not most modern aircraft simulators employ some type of visual system to provide these visual cues, and over the years almost every imaginable system for providing a realistic dynamic visual scene has been used.

There are various types of scene generation systems which are used with modern vehicular or aircraft simulators and these include motion film projection systems, camera model systems, and digital image generation systems. However, experience has shown that the more acceptable systems used today, are substantially limited to camera model systems such as described in U.S. Pat. Nos. 2,975,671; 3,643,345; 3,670,426 and 3,961,133, and computer generated image systems, such as those systems described in U.S. Pat. Nos. 3,621,214; 3,826,864 and 3,961,133.

It will be appreciated by those skilled in the art, that the generation of a visual scene from digital data first requires the digitizing of every feature in the scene that is to be shown. Providing a dynamic visual scene suitable for use on an aircraft simulator which is unrestricted in its position, altitude, and attitude (within geographical limits, of course) perhaps presents the most difficult problems of all for computer generation. These problems include features to present, as well as the respective position of each feature with respect to every feature that is to be illustrated on the display screen. Various techniques have been developed to accomplish this task. To those knowledgable in the field of computer image generation and the use of computer image generation in aircraft simulation, it will be appreciated that one of the most successful techniques of solving the myriad of tasks associated with computer image generation is the use of a visual pyramid representing the entire FOV (field of view) of the aircraft pilot. A complete description of this technique is available by referring to U.S. Pat. Nos. 3,621,214 issued to George W. Romney et al.; 3,639,736 issued to Ivan E. Sutherland; and 3,889,107 issued to Ivan E. Sutherland.

However, even though the basic techniques for providing dynamic computer generated images are well known to those skilled in the art, there are still problems associated with computer image generated visual scenes which distract from the realism of such a scene. For example, determining exactly when to process and introduce a feature in a dynamic visual scene is not simple and straight forward. In particular, it will be appreciated that some features such as a mountain are very large while another feature such as a building might be relatively small. Therefore, it is clear that the "mountain" in the flight path must be introduced in the dynamic visual scene long before the building. However, as the aircraft continues to move along the flight path and moves closer and closer to the building, even details of the building may (or should) become visible. Thus, a technique or "criteria" to determine when a feature is to be introduced must be established. Unfortunately, establishing the appropriate criteria also presents problems. For example, if a minimum size is the only criteria, and a size just small enough to be perceptable is choosen as the minimum size, then there is often the very disturbing occurrence of the feature scintillating or blinking in and out of the view. On the other hand, if the computer does not generate the feature until the size of the feature is so large that it will clearly always be visible to the pilot, the sudden "popping in" of a feature that was not present earlier is also very disturbing, and, of course, unrealistic.

Therefore, it is an object of the present invention to provide methods and apparatus for producing a signal representing the correct instantaneous amount of blending needed to blend a selected feature into a dynamic computer image generated scene which avoids the scintillation and "pop in" effect.

It is another object of the present invention to provide methods and apparatus which allows a selected feature to be blended into a computer generated scene at a shorter range without the feature seeming to "pop in" to the scene.

It is yet another object of the present invention to provide methods and apparatus for blending selected features into a dynamic visual scene and for determining the processing load of a computer image generation system.

DISCLOSURE OF THE INVENTION

Other objects and advantages will in part be obvious, and will in part appear hereinafter, and will be accomplished by the present invention which discloses methods and apparatus for use with a computer image generation system which provides a dynamic scene as viewed from an eye point of a viewer such as the pilot of an aircraft. Such a computer generation system includes a main data base containing information representing features of the scene to be presented, a display means, and a main computational unit for generating the dynamic scene. The present invention provides methods and apparatus for determining a ratio for blending new features into the dynamic scene. Included is a control data base which contains selected information related to selected features contained within the main data base. The selected information includes the spatial coordinates of a selected control point related to the selected feature and a preselected range at which the selected feature is to be first included in the dynamic visual scene. A control unit is also included for determining when the selected control point is within the range for which it should be included. There is also included means for receiving data representative of the selected control point from the control data base for determining the location of said selected control point on a theoretical image plane above the viewers eyepoint. A blending ratio for the selected feature according to the position of the control point on the image plane with respect to the distance away from the viewer's eye point is then determined. Means are also included for providing a signal representative of the determined location on the theoretical image plane.

BRIEF DESCRIPTION OF THE DRAWINGS

The above mentioned feature of the present invention will be more clearly understood from the consideration of the following description in connection with the accompanying drawings in which:

FIGS. 1A, 1B and 1C illustrate a perspective view of the visual pyramid used in a particular technique of dynamic computer image generation as the aircraft moves along a selected flight path.

BEST MODE FOR CARRYING OUT THE INVENTION

Figure 2A:
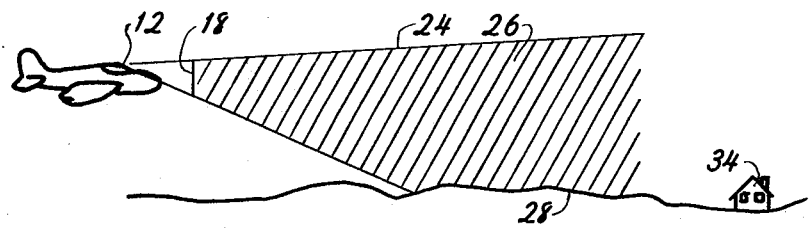
FIGS. 2A, 2B and 2C are side views of the visual pyramid of FIGS. 1A, 1B and 1C.
Figure 2B:
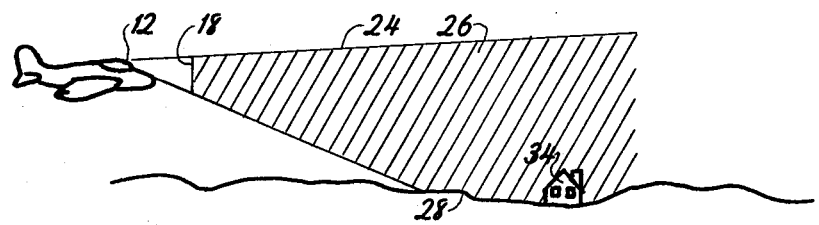
Figure 2C:
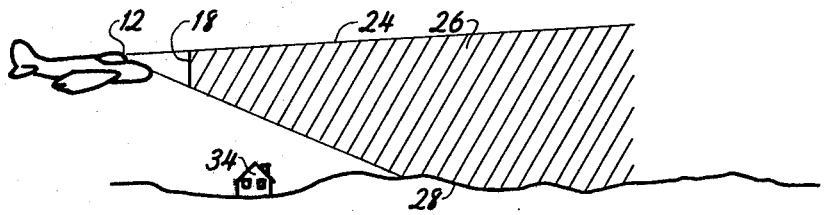
Figure 3A:
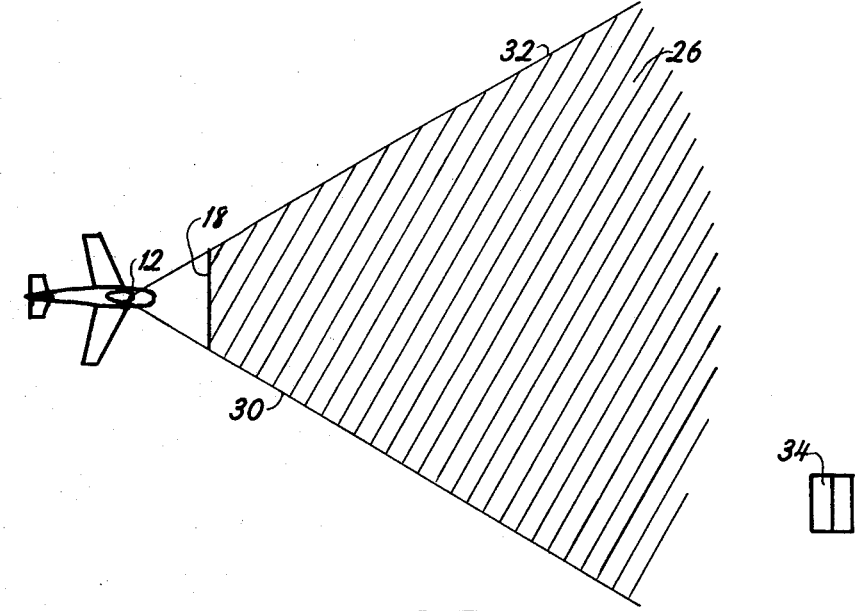
FIGS. 3A, 3B, and 3C are top views of the visual pyramid of FIGS. 1A, 1B and 1C.
Figure 3B:
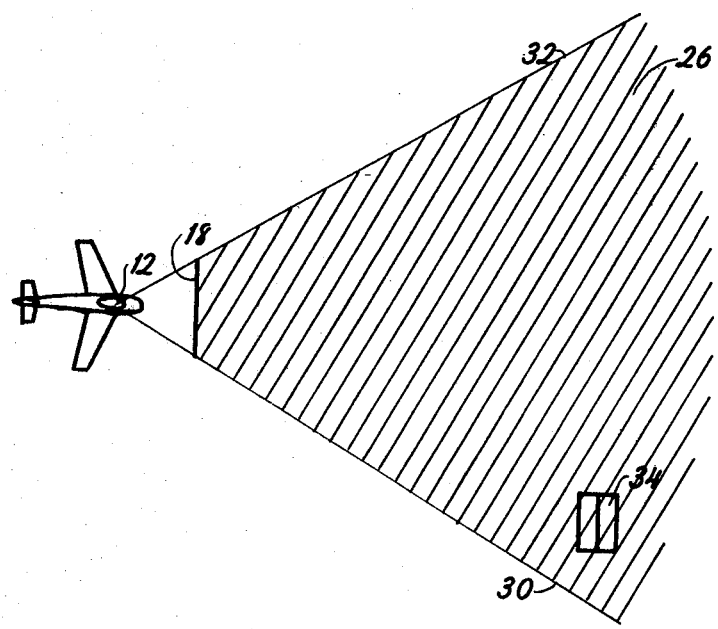
Figure 3C:
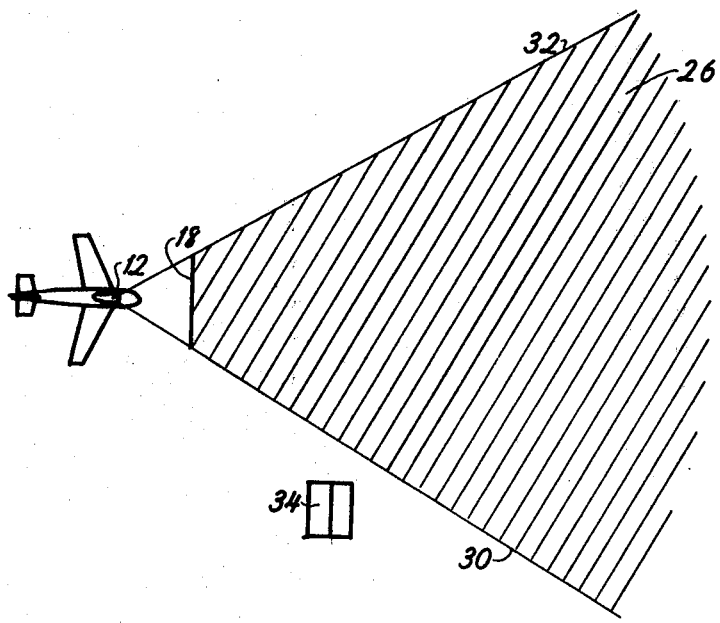

Referring now to FIG. 1A there is shown a pyramid 10 representing the usual visual pyramid used in computer image generated scenes. As can be seen, pyramid 10 extends from apex 12 at the pilot's eye point 14. A maximum distance is represented by the cylindrically curved base 16 of the pyramid 10, and all features of the terrain, including buildings, rivers, etc., fall within pyramid 10 and are available for display, and as is appreciated by those skilled in the art, such features are "projected mathematically" such that they fall on image plane 18. It will be appreciated, of course, that for aircraft simulation through a front window, the visual pyramid will be moving forward in the direction of arrow 20 as the simulated aircraft moves forward. Thus, a feature such as building 22 which is outside of the visual pyramid of FIG. 1A will eventually move into the visual pyramid as is indicated in FIG. 1B. However, if the "aircraft" continues its "flight" in the same direction, building 22 will sweep by the aircraft and move out of the visual pyramid as is shown in FIG. 1C. It will be appreciated, of course, that some features are very large while others are so small that they would not be visible by a pilot when they first fall within the visual pyramid. However, as the aircraft continues to move forward, they will eventually become visible. Determining when such features fall within the visual pyramid 10 is typically handled or accomplished by the basic computer image generation system. Determining when the feature is actually to be processed for use on the visual screen presents the various problems discussed heretofore in the background of this application. For example, if a minimum size is the only criteria, and a size just small enough to be perceptable is chosen as the minimum size, then there is often the very disturbing occurrence of the feature scintillating or blinking in and out of the view. On the other hand, if the computer does not generate the feature until the size is so large that it will clearly always be visible to the pilot, the sudden "popping" in of a feature that was not present earlier is also very disturbing, and, of course, unrealistic. Referring now to FIGS. 2A, 2B, 2C, 3A, 3B and 3C, there are shown top and side views of the visual pyramid discussed hereinabove. As shown in FIG. 2A, the upper extent of the view the pilot sees on a screen display is limited by top edge 24 of the field of view indicated by shaded area 26. The earth 28 under the generated scene actually limits the downward field of view, whereas, as is shown in FIG. 3A, the pilots horizontal field of view also illustrated by the shaded area 26 is constrained by selected outer limits reprsented by edges 30 and 32. Thus, as is shown in FIGS. 2A and 3A, an object such as building 34 is outside of the field of view as the "aircraft" approaches the object. Then, as is shown in FIG. 2B and 3B the object comes into view as it intersects the shaded area representing the visible area. Eventually, of course, the building will pass out of the visual area as is indicated in FIGS. 2C and 3C. As was discussed above, to provide an enriched foreground it is desirable that many of the small features such as the building 34 not be brought into the scene until they are well within the confines of the field of view. For example, if the field of view extends in a forward direction for many, many, miles, a small house or structure would not be visible until the structure was well within the visual pyramid. However, to avoid the problems of "pop in" and scintillation discussed above, it is desirable that these small features which will enrich the total displayed scene be slowly blended into the total visual scene so that they can gradually be differentiated from the background. At the same time, the number of features accepted for such blending and display must be kept managable and kept within the limits of the computers capacity by accepting the smaller or less important features at successively shorter ranges. At the same time, of course, because of the smaller areas actually covered near the apex of the field of view, (that is, the point closest to the eye point), the number of features will not simply continue to increase, as the old features, both large and small stream by out of the field of view on the sides or bottom as is illustrated by building 34 in FIGS. 2C and 3C.

Figure 4:
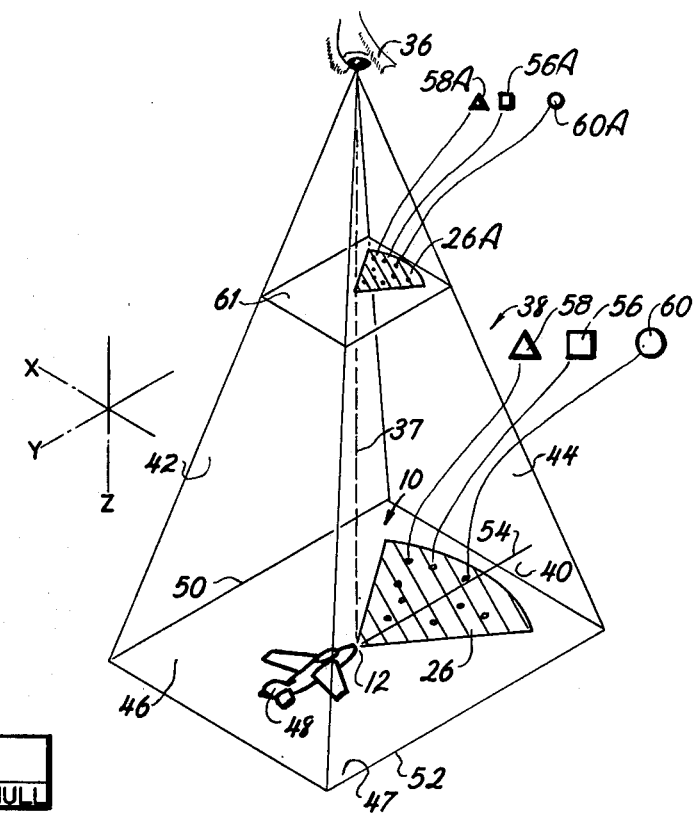
FIG. 4, is a perspective view of a visual pyramid which encloses the pyramid of FIGS. 1A, 1B and 1C as well as the "aircraft."

Referring now to FIG. 4, to accomplish this blending and also keep the number of features to an acceptable minimum, the present invention "looks" at the total scene from a distant eye point 36. Eye point 36 could extend through the pilot's eye point 12 as shown by line 37 or alternately could be at any known selected point above the pilot's eye point. As shown in FIG. 4, eye point 36 is located above the aircraft such that the visual pyramid 10 associated with the pilot of the aircraft along with the scene from the eye point 12 is itself contained within a vertical pyramid 38. In this embodiment, the vertical pyramid 38 is a square based pyramid and includes a front side 40, a left and right side 42, and 44, and a rear side 46. Aircraft 48 is presented in the scene along with the aircraft visual area 26. Thus, it can be seen that the eye point 36 is well above the eye point 12 of the pilot in aircraft 48. Further, the edges 50 and 52 of the enclosing pyramid 38 are aligned so that the center line 54 (which is also the line of flight) of the pilot's field of view illustrated by the shaded area 26 is parallel to edges 50 and 52 of the vertical pyramid. Various features in the pilot's field of view 26 such as the square 56, the triangle 58 and the circle 60 are shown. The pilot's field of view including square 56, triangle 58 and circle 60 are "projected" onto image plane 61 well above the aircraft. This image plane 61 is parallel to the base 47 of the vertical pyramid 38. As can be seen, image plane 61 includes the features of the pilot's field of view as is illustrated by the smaller square, triangle and circle 56A, 58A and 60A illustrated on image plane 61. It will be appreciated, of course, that the square 56, triangle 58, and circle 60 in the pilot's field of view will be represented by coordinate values X, Y, and Z which locate them at specific points of positions.

Figure 5:
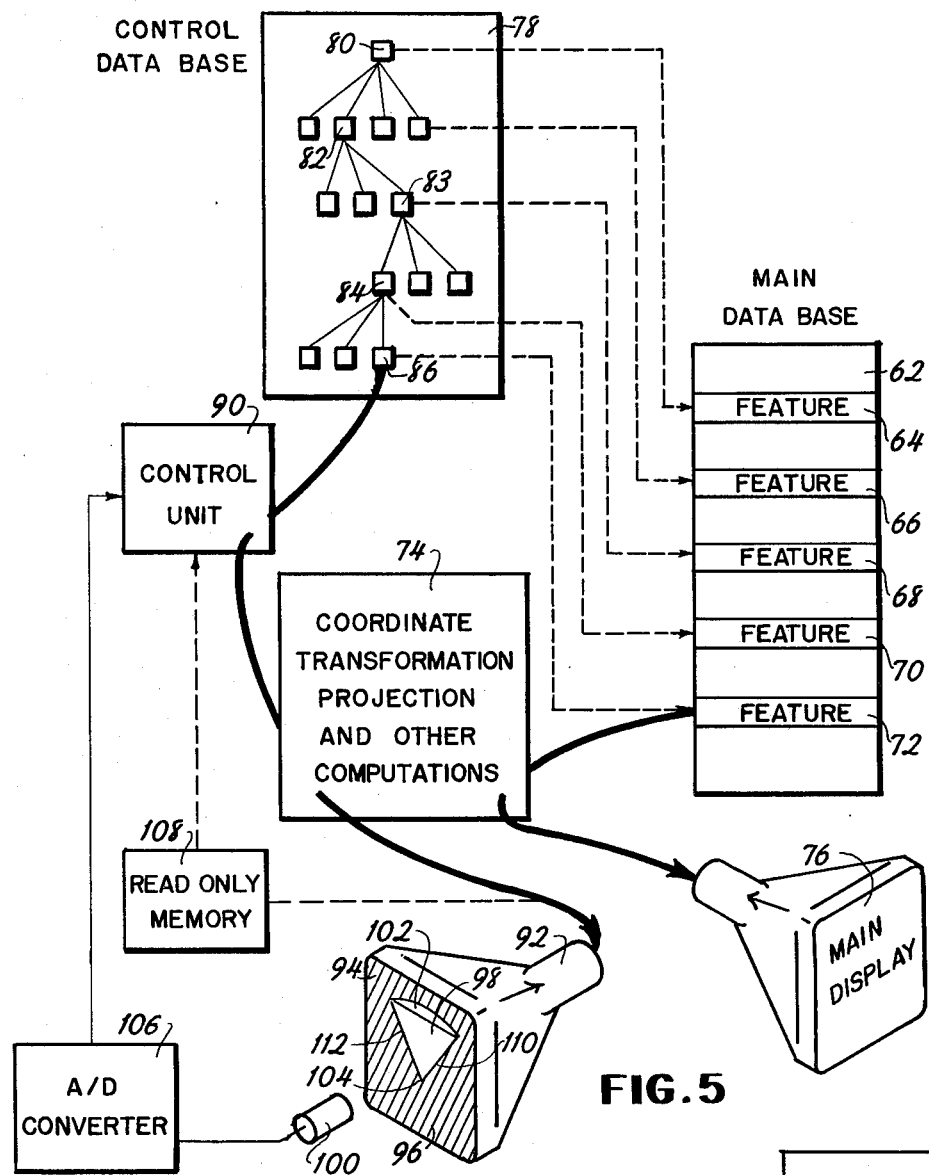
FIG. 5 is a part schematic part block diagram illustrating the features of the present invention.

Referring now to FIG. 5, there is shown a block diagram of the present invention as it operates in cooperation with the main data base, computational circuitry, and display means of the aircraft visual system. As shown, and as will be appreciated by those skilled in the art, the many and various features which are to be displayed to the simulator pilot are contained in a main data base 62. As shown, all of the data concerning each of the many and various features has its own data block as indicated by blocks 64, 66, 68, 70 and 72. The computational unit 74 retrieves the necessary data representing the various features from data base 62 and at that point proceeds to process the data as necessary to provide for the coordinate transformation, the projection, determination of scene priority and any other computations necessary to properly display the features on the main display represented by CRT 76. It will be appreciated, of course, that although a single computational unit 74 and a single display CRT 76 is illustrated in this block diagram, in actual practice separate computational units and a multiplicity of CRT displays properly synchronized and working in conjunction with each other is typically used for complex visual systems, while a second computation unit is used for purposes of the present invention. It will further be appreciated that the computational unit 74 of course may use any of the known techniques for providing and displaying scenes from digitized data. Further, although a raster scan technique of displaying data is typically used for the more complex systems, it will also be appreciated that even a calligraphic type display may be suitable.

Now, referring to both FIGS. 4 and 5 together, it will be appreciated that for purposes of the present invention, there is provided a second or control data base 78 which contains "control points" for each of the various features as represented by the X, Y, and Z coordinates. Thus, each of the various features that are displayed on the main display 76 (representing image plane 18 of the pilot's field of view pyramid 10) has associated therewith a "control point" which is at a given X, Y, and Z position in or near the center of the feature. This "control point" is available for projection and display on theoretical image plane 61 contained in the vertical pyramid 38 which is above the pilot's visual scene. Thus, for each feature in main data base 62, there are corresponding control points in the control data base 78 represented for example, by blocks 80, 82, 84 and 86. Each of these data blocks in control data base 78 will also include the address of the selected feature in the main data base 62. Thus, as was mentioned above, each of these data blocks also contains the X, Y, and Z coordinates of the control point necessary to determine the spatial location of a single feature. Of course for larger features there may be one or more control points representing subfeatures of a main feature. Further, each control data block associated with a feature also contains information as to the range at which the feature (or subfeature) should be brought into the scene. Further, it has been found desirable for other purposes, that the control data blocks also contain information representing the processing or display load associated with the feature when that feature is chosen for processing.

As shown, the control data blocks 80, 82, 83, 84 and 86 are arranged hierarchically within the control data base 78. At the top of this "data tree" is a control block represented by reference 80. Control block 80 points to a number of lower control blocks each representing a particular feature in the main data base which describes the terrain or features presented to the pilot. As shown, the top data block 80 points to four other sub data blocks including data block 82. Data block 82 points to three others including data block 83 which in turn points to data block 84. Finally, data block 84 points to data block 86. Thus, it can be seen that a large feature may slowly reveral smaller and smaller features as the aircraft approaches the main feature thereby providing more realism. As the aircraft approaches a major complex feature, there will be an indication that there is a minor set of features associated with the major features which should be examined to determine when and where they should be included. As the minor feature is included, there may then be indications that other minor features even less prominent than the feature just included shoul be examined to determine when and where they should be included in the scene.

To accomplish this, there is included a control unit 90 which examines each of the control data blocks 80, 82, 83, 84, and 86 in control data base 78 as necessary to determine when the associated control points fall within the field of view. According to one embodiment, the control unit 90 examines the X and Y coordinates of the control point as provided by control data base 78. These control points are then forwarded to the computational unit 74 where they are "mathematically" projected to image plane 61 of the vertical pyramid 38 discussed with respect to FIG. 4. A spot representing the mathematical projection onto image plane 61 is then displayed on a second monitor CRT 92 which represents image plane 61. Included on face 94 of CRT 92 is a mask or template 96. Mask or template 96 is substantially opaque except for the pie shaped sector 98 which represents the horizontal field of view of the pilot's visual area 26. Thus, it will be appreciated that any of the control points displayed on CRT 92 will only be visible if they are in the cut out pie shaped area 98 representing the pilot's field of view. This is because of the opaque mask or template 96. Since the control points are displayed one at a time and at a specific location for each particular control point, it will be appreciated that the displayed control point will appear at a specific location on CRT 92 when the control point representing the feature is in the pilot's field of view. The displayed control point is then picked up by a photo cell or other sensor 100. The output of photocell 100 is then converted to a digital signal by A-D convertor 106, which signal is provided to control unit 90, which in turn provides blending ratio information to the computational unit 74 so that the feature can be blending into the scene. The proper blending ratio is obtained, by having the transmissability of pie shaped section 98 vary from very low at the outside edge of the pie section to very high or a maximum (clear) at positions closer to the apex of the pie shaped section. For example, if a control point generated on face 94 of CRT 92 just barely falls within the pie shaped sector 98, the light of the displayed control point would be substantially blocked by the mask and only a very weak indication would be picked up by photocell 100. Thus, when the control unit 90 receives a signal indicating the low intensity picked up by photocell 100, this information can be passed to the main computational unit. The main computational unit will then generate the details of the feature such as the color so that there is very little contrast between the color of the feature and the background of the feature. However, as the "flight" moves forward, the control spot will move closer to the apex of the pie shaped section and consequently get brighter as the transmissability gets greater. This "increased light" information is provided to control unit 90 which in turn sends the blending ratio signal to computational unit 74 so that the computational unit can adjust the relative color contrast to an appropriate level for the particular feature. The blending ratio continues to change as the feature moves closer to the apex of the pie shaped sector and the transmissability increases.

The "blending ratio" which is provided to the computational unit 74 from control unit 90 may, of course, be used as desired to control the prominence of a feature with respect to its background. In one particularly effective technique, the blending ratio is used to mix the color of a feature with the color of a part of the background lying immediately behind the feature, as seen by the pilot. As will be appreciated by those skilled in the art, the face of the display CRT 76 can be considered as being divided into tiny picture elements called pixels. For each pixel, computational unit 74 generates the necessary signals such that the pixel has a particular color and intensity. When the full CRT 76 is viewed, these individual pixels produce the desired scene. Of course, if the scene is moving, the computations must be repeated for each pixel many times per second. According to one embodiment of the present invention, the color and intensity information computed for a certain pixel of a feature is considered in relation to the color and intensity information computed for the background at that same pixel. In the usual digital image generator, the color and intensity of the object closest to the pilot's eye (in this case the feature) would take complete precedence over all other objects, and its color and intensity would be used exclusively in that pixel. In one embodiment of the present invention, the blending ratio is used to mix the color and intensity of the feature with that of the background at the same pixel, according to the following equation:

$$C_p = RC_f + (1-R)C_b,$$

in which $C_p$ represents the color or intensity of the pixel, $C_f$ represents the full value of the color or intensity of the feature at that pixel, $C_b$ represents the full value of the color or intensity of the background at that pixel were the feature not there, and R represents the blending ratio, which progresses from near zero at the outer boundary of the pie-shaped section to a value of one at some point closer to the apex of the pie-shaped section. Thus, the color of each pixel throughout the feature is a mixture of the color of the feature at that point and of the background that would exist at that pixel, that is, directly behind the corresponding part of the feature. As the feature comes closer to the pilot's eyepoint, the change in the blending ratio picked up by photocell 100 will cause the color and intensity to be "ramped" from that of the background to that of the feature in any given pixel. The overall effect of this operation is to cause the feature to become gradually differentiated from its background as the pilot's eyepoint approaches the feature.

Thus, the selected feature can slowly be blended into the scene in a manner as would happen in an actual scene viewed by a pilot in a moving aircraft. Consequently, the "popping" in and out, or the sudden appearance of a feature not presented before to a simulator pilot is eliminated.

Because of the various sizes and features that must be examined, it will be appreciated that to cause blending to occur at the proper ranges, the scaling of the initial projection onto the screen 94 of CRT 92 will often be quite different for various control points. This scaling is accomplished by artificially associating a maximum visibility range with each feature. This range is usually, but not always related to the size of the feature. This maximum visibility range of the featur is included in the data in the control data base 78. Then, by proper control of computational unit 74, the projection of each control point is scaled so that if it is at a range equal to the stored maximum value it will fall exactly on the outer range represented by edge 102 of template 96.

Although the technique discussed heretofore is graphic and aids understanding, it will be appreciated that in a completely digital system such an additional CRT and A-D convertor is not necessary. For example, the CRT 92, the opaque mask 96 having a cut out 98, the photocell 100 and the A-D convertor 106 may readily be replaced by a ROM (read only memory) 108. The inputs to the ROM 108 are simply the X and Y values on the image plane after these values have been scaled according to the range value also stored in the control data base. These X and Y values are then converted directly to an address in read only memory 108, such that they can access data therein. The data or contents of the ROM 108 represent a direct value of the light transmissability values which would be present on the pie shaped cut out 98. Thus, the output provided by read only memory 108 to the control unit 20 would be substantially the same as the outputs from the A-D convertor 106 and therefore provide directly the ratios necessary for manipulation by mathematical unit 74.

To avoid unnecessary computations, it will be appreciated that in the preferred embodiment, the control unit 90 will maintain in an internal memory data corresponding to the transmissability of features previously evaluated. However, it is still necessary to periodically test the points to determine if their blending ratios have changed or if they have left the field of view. That is, has the aircraft moved forward to a point that the feature is behind the apex 104 or moved out of the side of the sector as represented by lines 110 and 112.

Thus, it can be seen that there has been described a technique for finding the ratios for blending features into a computer image generated visual scene. However, the present invention has also been found useful in helping to control the total processing load which must be handled by the mathematical unit 74. This is done by including, within the control data blocks such as blocks 80, 82, 82, 83, 84 and 86 contained in control data base 78, information representing the total processing load of a selected feature which is located in the main data base. The control unit 90 may then maintain a running total of this data which represent the total processing load which may be experienced at the image generator 74. So long as the upper limit or capability of the computational unit 74 has not been reached, the control unit 90 may research the control data base 78 at lower and lower levels than were originally indicated for a feature. That is, since there is capacity remaining within the mathematical unit 74, sharper and sharper detail can be presented on the main display 16 by the inclusion of additional features. On the other hand, if there is an indication that the computational unit will be overloaded, unit 90 will then stop processing the lower level features and revert to a higher level until the mathematical computational unit 74 is again operating within its tolerance. To accomplish this task, the control unit 90 will simply alter the scaling so that fewer control points will appear within the pie shaped sector.

Figure 6:
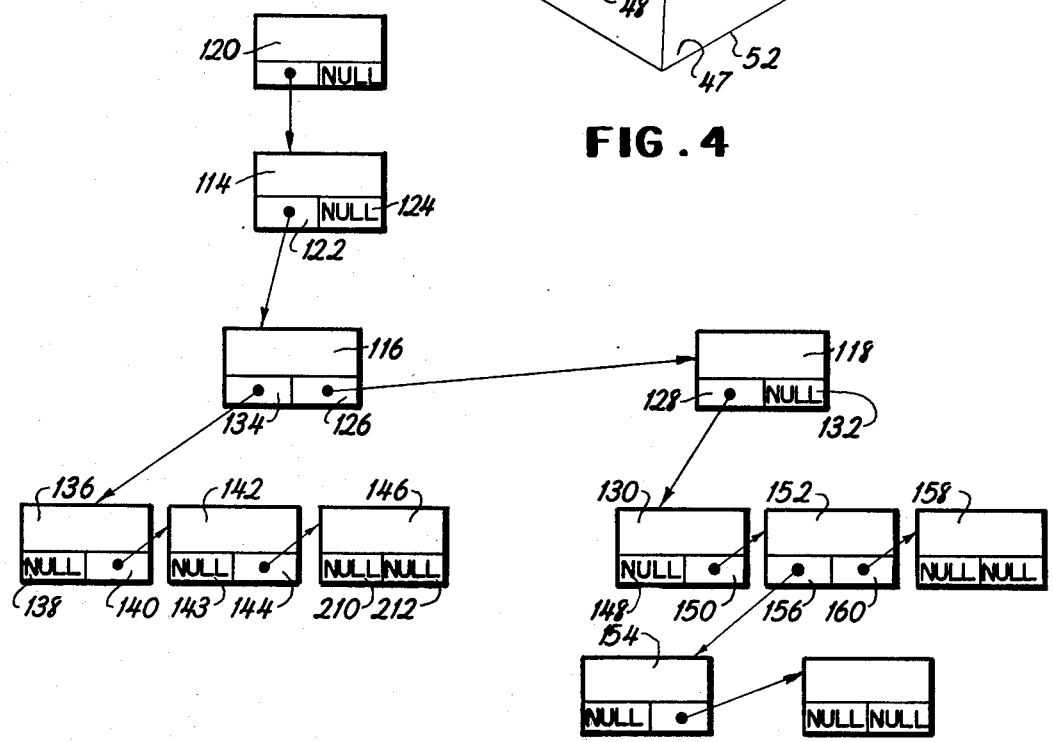
FIG. 6 is a block diagram showing a scene management tree as used in the technique of the present invention.

Referring now to FIG. 6 there is shown the typical structure for a hierachical control data base such as control data base 78 of FIG. 5. As shown, there is a root node element or data block 114, which points downward to all of the first level nodes or data blocks 116 and 118. Each of these first level nodes or data blocks is associated with a particular "entity" or feature of the digital image generated scene. This first level "entity" may typically be a matrix of geographical areas or could actually be a particular feature. However, each of the lower level nodes or data blocks will typically be associated with a particular selected feature or even selected details of a particular feature. In the present embodiment, there is also shown a "parent" of the root node or data block 120 which itself points downward to the root node or data block 114. This parent node 120 is included only for convenience as its existence considerably simplifies the algorithm for traversing the data base tree. The data block for each node at least includes (in addition to the X, Y and Z location of a control point and the scale factor as was discussed heretofore), a "down" pointer, and a "next" pointer, which pointers are in fact address references. As shown in FIG. 6, the down pointer 122 of root or data block 114 points to the first level node or data block 116. However, the "next" pointer 124 of root data block 114 is null which means that there are no other root nodes in the particular data management tree. First level data block 116 on the other hand does include a pointer 126 which provides the address reference of the "next" first level data block 118. As shown and as will be discussed further, hereinafter, first level data block 118 does include a "down" pointer 128 or address reference of a subservient node 130, but the "next" pointer 132 of first level data block 118 is null which means that block 118 is the end of the chain and there are no more first level data blocks in the management tree. First level data block 116 also includes a down pointer 134 which provides the address reference to subservient node or data block 136. However, subservient data block 136 includes a null for the down pointer 138 which means there are no further details to be considered in the feature. Subservient data block 136 does however include an address reference or "next" pointer 140 to the same level subservient node 142. In a similar manner, subservient node 142 has no lower level nodes but does include a reference address in "next" pointer 144 which points to the node 146 which is of the same level. Referring again to first level node 118, down pointer 128 provides a reference address to subservient node 130, which has a null value in its down pointer 148, but does include an address reference in the "next" pointer 150 to another subservient node 152. Subservient node 152 on the other hand includes an address reference into an even lower level node 154 in its "down" pointer 156 as well as another subservient node 158 in the "next" pointer 160.

Figure 7:
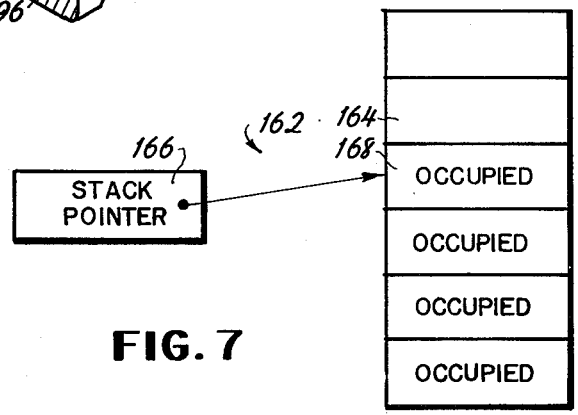
FIG. 7 shows a computer stack and stack pointer as used in the technique of this invention.

An algorithm suitable for transversing the management tree will be discussed in detail hereinafter. However, to aid such discussions it will be appreciated that operation of the algorithm can be assisted by control data base 78 if control data base 78 also includes two dedicated storage locations (not shown) for holding the address pointers of the "Upper Selected Node" and the address of the "Lower Selected Node." Control data base 78 further includes a "computer stack" such as shown in FIG. 7 generally at 162. In operation, addresses of items are "pushed" on the stack so that an item's address is stored in the next available location in the stack, such as shown at location 164. Further as will be appreciated by those skilled in the art, the "stack" pointer 166 always points to the most recently stored item. Thus, when an item such as an item in location 164 is removed from the stack 162, stack pointer 166 would then read the address in the next previous entered location 168 as shown. Thus, the stack implements a last-in, first-out list.

Figure 8:
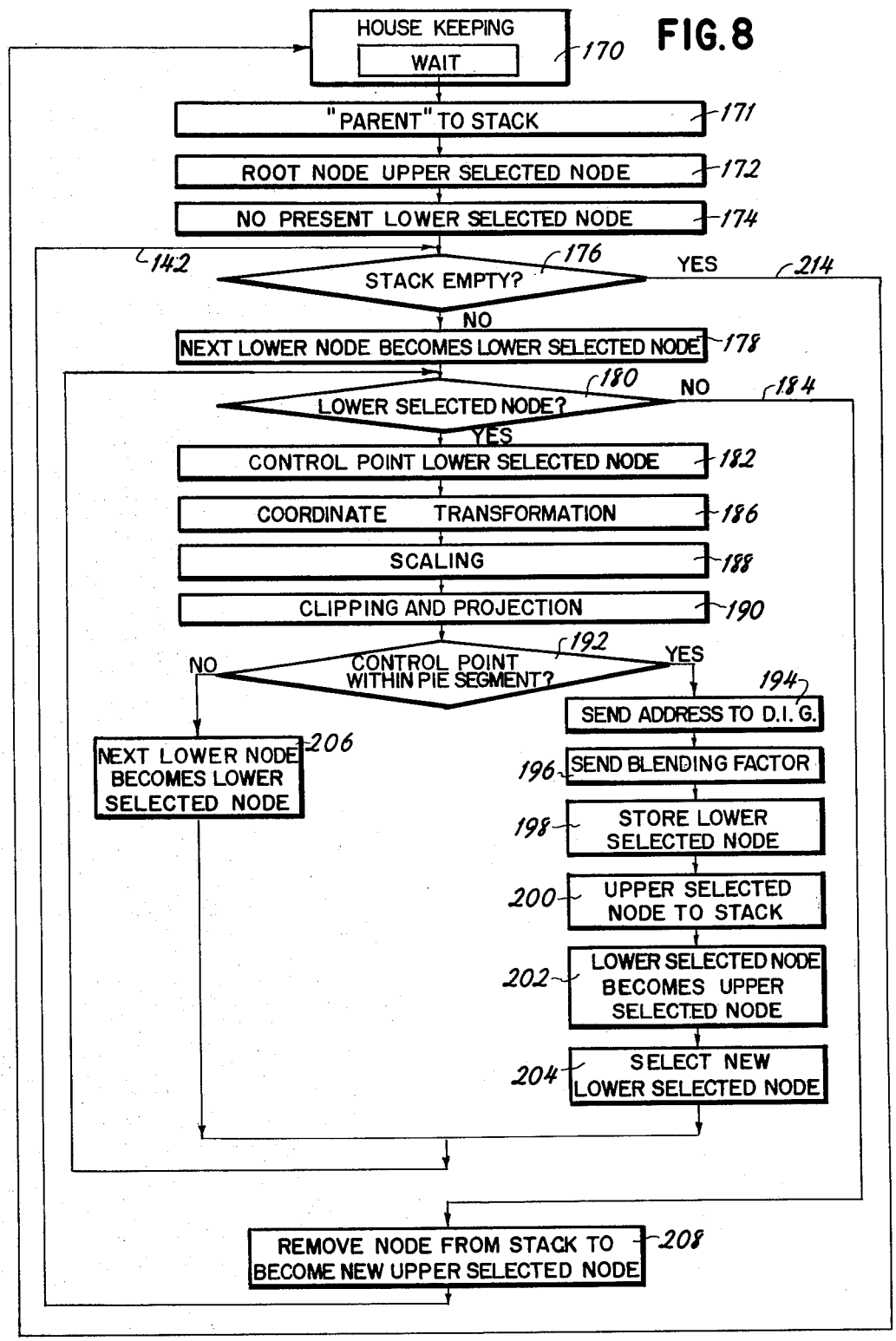
FIG. 8 is a flow chart illustrating a scene management technique suitable for use with the present invention.

Referring now to the flow diagram of FIG. 8 along with FIGS. 6 and 7, a particular algorithm for scene management will be discussed. It will be appreciated, of course, that the algorithm of FIG. 8 is an example only, and other algorithms could be used. A shown, various housekeeping chores are first accomplished by block 170. The "parent" or data block 120 as shown in FIG. 6 is then pushed onto the stack such as in location 164 of FIG. 7 as is required by block 171 of FIG. 8.

The root node 114 is then selected by block 172 as the Upper Selected Node. At this point, the Lower Selected Node dedicated storage location is cleared as is indicated by block 174. The next action block 176 determines whether or not the stack is empty. Of course in this instance the stack is not empty since parent block 120 of FIG. 6 was previously placed within the stack or as directed by element 171 of FIG. 8. Thus, the action flow progresses to the following block 178. Since there is no address in the Lower Selected Node storage location in control data base 78, the first node made in the chain which is subservient to the upper selected node will become the lower selected node and its address placed within the lower selected node storage location. Thus, as shown in FIG. 6, the first subservient node to root node 114 is first level node 116. Thus, at this point, both the upper selected node location and the lower selected node location in control data base 78 are filled. The algorithm then progresses to action block 180 which determines whether or not an address is in in the lower selected node storage location. In the instant case, the address of first level node 116 was placed in the storage location and therefore the answer to the question is yes and the algorithm progresses to block 182. It will be appreciated that if both the "next" pointer 124 and the "down" pointer 122 of the root node 114 has been null, then the answer to action block 180 would have been no and the have progressed along the path indicated by line 184. As shown, block 182 reads the spatial coordinate position of the control point for the lower selected node. The control point is then transformed using the eye point 36 of FIG. 4 as indicated by block 186 and as was discussed hereinabove. After the transformation, the proper scaling is then accomplished by using the scale factor also contained in the data block 116 as is indicated by block 188. The necessary clipping and projection to image plane 61 of FIG. 4 is then accomplished as is indicated by algorithm block 190. At this point, the algorithm continues to action block 192 which determines whether or not the control point appears within the pie shaped section 98 as indicated by FIG. 5. If in this discussion it is assumed that the answer is yes then the algorithm progresses to block 194 which sends the address of the entity or feature associated with the lower selected node 116 as shown in FIG. 6, to the primary computational or digital generation unit 74. Subsequently, as shown in block 196 the blending factor as determined and discussed heretofor is also provided to the digital image generation unit. As shown in blocks 198 and 200, the address identification of lower selected node 116 is then stored in the upper selected node location of control data base 78 (along with the original upper selected node) and the current upper selected node 114 (along with this stored lower selected node) is pushed onto the stack 162 on top of or ahead of parent node 120 which was previously placed on the stack. The purpose of storing the lower selected node in the stack with the upper selected node is so that when the upper selected node is again retrieved, the system will know at which subservient node it left off. Thus, as indicated by algorithm block 202 the lower selected node (node 116) now becomes the upper selected node. The algorithm, then progresses to block 204 wherein the first or next subservient node under the upper selected node is selected as the new lower selected node. In the instant case, since the new upper selected node is now the first level storage block or node 116, the lower selected node will be node 136 as shown in FIG. 6. Thus, as can be shown, the program or algorithm then progresses back to a point above the action block 180. Block 180 then determines whether there is an address in the lower selected node. However, it will be recalled that the storage address of block or node 136 was placed in the storage location for the lower selected node. Thus, again the algorithm progresses through steps 182 and 190 such that the appropriate transformation, scaling and clipping for the feature described in storage location or data block 136 is accomplished. At that point, of course, the algorithm is again at action block 192 which determines whether or not the feature described in "Lower Selected Node" location (node 136) is in the appropriate pie section area 98 as discussed with respect to FIG. 5. If in the present instance we assume that the control point for the feature represented by node 136 is outside of the pie section, (field of view) then the algorithm will take the alternate path and progress to block 206. It will be appreciated that since the features in 136 is outside of the pie section area, it would be a waste of computational time to perform the chores associated with blocks 194 through 204 of the algorithm. Thus, as shown in block 206 the next node under the upper selected node 116 becomes the new lower selected node. That is, the lower selected node 136 is now replaced with the address of lower selected node 142. The algorithm then again returns to the action block 180 and determines whether there is an address in the lower selected node storage location. Of course, the address of node 142 was placed within the lower selected node storage location and therefore again the algorithm progresses through the actions determined by blocks 182 through 190. If in the present instance we assume that this feature is within the pie shaped section 98 in the screen of the CRT as shown in FIG. 5 it will also be appreciated that the actions determined by blocks 194 and 196 are executed. Then, as shown in blocks 198 through 202 the upper selected node or first level node 116 is then pushed onto the stack, and the lower selected node 142 is selected to be the new upper selected node such that its address is placed in the upper selected node storage location of control data base 78. Then, as shown in block 204 the first node under the new upper selected node which is now node 142 is selected as the new lower selected node. However, as shown, down pointer 143 is empty, and therefore this address will be a null. The program then progresses back to the point above action block 180. This action block then again looks at the address in the lower selected node. However, as was just discussed, down pointer 143 of node 142 was empty or null and therefore no node will be found and the program will continue along the path indicated by line 184. As shown, the program then progresses to the block 208 which removes the last entered node from the stack and sets it as the new upper selected node. In the present instance, the node 142 was the new upper selected node therefore it is moved off of the stack such that the first level node 116 again becomes the upper selected node. Also removed from the stack at this time is the last-used subservient node under node 116; that is, node 142 which had been stored with node 116 prior to node 116 having been put in the stack. After this action which is required by block 208, the program progresses back to a point above the action block 176 which determines whether or not the stack is empty. Of course, the stack is not empty as the root node 114 and parent node 120 are still present in the stack. Thus, the program progresses to block 178 such that the next node under the upper selected node 116 is selected as the lower selected node. This is determined by reference to node 142 as retrieved from the stack with node 116. Next pointer 144 of node 142 of course points to node 146 and, node 146 therefore becomes the new lower selected node. The program again advances to action block 180 to determine whether there is an address in the lower selected node. Since the address of node 146 has been stored as the lower selected node, the program again progresses through blocks 182 and 190 and then assuming that the control point was included in the pie shaped section (ie was in the field of view) the program advances through blocks 194 and 196 to provide the necessary blending information to the main computational unit 74 of FIG. 5. At that point, the program progresses through blocks 198 and 204 such that first level node address 116 is pushed onto the stack and the lower selected node storage location which presently contains the address of node 146 is selected to be the new upper selected node. Then, as shown in block 204 the address of the next lower node contained in down pointer 210 is selected as the new lower selected node. However, as shown, down pointer 210 contains a null. As discussed above, the program then advances once more to action block 180. However, since the down pointer 210 was a null value, an address is not found and therefore the program advances along the path as determined by line 184 to the block 208. As was discussed heretofore, block 208 then removes the top address location from the stack which as will be recalled was first level node 116 and replaces the upper selected node storage location with the address of the first level node 116. The program then advances again to action block 176 which determines whether or not the stack is empty. Of course the stack is still not empty so the program progresses to block 178 to determine the next node under the upper selected node 116. As shown, the next address indicated by next pointer 212 of subservient block 146 is also null. Thus, the lower selected node storage location will not contain an address, and when the program progresses to action block 180 a lower selected node address is not found. Therefore, the program advances along the path indicated by line 184 to the block 208. At this point root node 114 is removed from the stack and now becomes the upper selected node. The program then progresses to block 176 to determine whether or not the stack is empty. The stack, of course, is not empty as the parent 120 is still located on the stack. Therefore, the program progresses to block 178 to determine the next node under the upper selected node (root node 114). As can be seen, the next node as indicated by "next" pointer 126 in first level node 116 under root node 114 is the other first level node 118.

Thus, the same procedure with respect to the branch of the tree starting with first level node 118 can then be followed to determine which features in this branch of the tree should be included in the computer image generation. When last subservient node such as node 158 is processed, the program will be at the location of the algorithm 208. At this point, the algorithm, cycling through blocks 208, 176, 178, 180, and again 208, will remove successively from the stack nodes 118 and 114, after which the parent node 120 will be removed from the stack and the program will continue to block 176.

However, at this point when the action block 176 makes determination as to whether or not the stack is empty, it will be appreciated that now the stack will be empty and the algorithm will progress according to path 214 and return to housekeeping block 170 so that a new scene management tree may be initiated. From the foregoing, it will be appreciated that the flow chart or algorithm will search the scene generation tree all the way to its lowermost level on the left side as illustrated in FIG. 6 before searching any additional areas on the right side. Thus, it will be appreciated that the algorithm does not search in a particularly balanced way. However, such an unbalanced search will be acceptable if the data base itself is balanced. That is, if the density of the entities in the various range categories is such that the algorithm can pick up all entities which should be shown without overloading the digital image generator computer then no problems will develop. Of course, this means that the very numerous and very close or local entities such as trees or shrubs must have short visibility ranges and only the less numerous items such as mountains may have long visibility ranges. If this condition is correctly preadjusted into the data base, it will not matter how the scene management tree is searched as all of the entities will be sent to the digital image generator (DIG) computer and the computer will not be overloaded. However, if the data base is not preadjusted in this matter, the unbalanced search could overload the DIG with entities from the left side of the scene tree while leaving out of the picture entities of a much higher level on the right hand side.

Thus, although the present invention has been described with respect to specific methods for providing the blending of features into a computer image generated scene, it is not intended that such specific references be considered limitations upon the scope of the invention except insofar as is set forth in the following claims.

I claim:

1. In a computer image generation system for providing a dynamic scene as viewed from an eye point of a viewer, and which system includes a main data base containing information representing features of the presented scene, a display means, and a main computational unit for generating said scenes, apparatus for determining the ratio of blending for new features into the total scene comprising:

a control data base containing selected information related to selected features contained within said main data base, said selected information including the spatial coordinates of a selected control point related to a selected feature and the range at which said selected feature is to be first included in said dyanamic visual scene;

a control unit for determining when said selected control point is within a selected range at which said feature should be included;

means for receiving data representative of said selected control point from said control data base and for determining the location of said selected control point on a theoretical image plane above said viewer's eye point;

means for determining a blending ratio for said selected feature according to the position of said selected control point on said image plane with respect to a selected eye point above said viewer's eye point; and means for providing a signal representative of said determination to said main computational unit such that said feature may be blended into said dyanamic scene.

2. The system of claim 1 wherein said means for determining a blending ratio comprises a read only memory containing a multiplicity of blending ratio values one of which is selected according to the location of said selected control point on said theoretical image plane.

3. The system of claim 1 wherein said means for determining a blending ratio includes a cathode ray tube representative of said theoretical image plane and for displaying said selected control point on said cathode ray tube according to said control point spacial coordinates, said cathode ray tube further including a mask on the face of said cathode ray tube defining a pie shaped section wherein the apex of such pie shaped section represents the pilot's eye point and has maximum light transmissibility characteristics and the remainder of said pie shaped section varies such that it has decreasing light transmissibility which varies according to the distance from said apex;

a photocell for receiving variable amounts of light from said displayed control point depending upon the location of said selected control point upon said variable light transmissibility pie shaped section, and for providing an analog signal representative of the amount of light received by said photocell; and an analog to digital convertor for receiving said variable analog signal and converting said variable analog signal to a digital signal for application to said means for providing.

4. The systems of claim 1, 2 or 3 wherein said selected information includes a value indicative of the processing load for generating a selected feature and further includes means for monitoring the total processing load of the computational unit such that said selected range may be varied in response to the processing load of said computational unit.

5. In a process for generating and displaying by means of a computer image generation system, a dynamic visual scene to be viewed from an eye point of a viewer, an improved process for determining the ratio for blending new features into a total scene, comprising the steps of:

providing a control data base containing selected information relating to selected features of said dynamic scene, said information including the spatial coordinates of a selected control point for each selected feature and the range at which said selected feature related to said control point is to be included in said dynamic visual scene, determining when said selected control point is within the range for which it is to be included;

receiving data representative of said control point from said control data base and determining the location of said selected control point on a theoretical image plane above said viewers eye point;

determining a blending ratio for said selected feature according to the location of said selected control point on said theoretical image plane with respect to a selected eye point above said viewer's eye point; and providing a signal representative of said determination to said computer image generation system such that said feature may be blended into said dynamic scene.

6. The process of claim 5 and wherein said step for determining a blending ratio includes receiving signals representative of said selected control point on said theoretical image plane and providing a blending ratio signal from a read only memory according to the location of said selected control point on said theoretical image plane.

7. The process of claim 5 wherein said steps of determining the blending ratio includes displaying said selected control point on a cathode ray tube having a mask defining a pie shaped section wherein the tranmissibility of said pie shaped section decreases in some manner according to the distance from the apex of said pie shaped section, determining the amount of light from said selected control point transmitted through said pie shaped section and providing an analog signal representative of said light tranmitted therethrough; and converting said analog signal to a digital signal representative of said tranmissibility as said desired blending ratio.

8. The process of claim 5, 6 or 7 wherein said selected information includes information concerning the processing load of each individual feature to be generated, and further including the steps of monitoring the processing load of the computer image generation system, and varying the range at which features may be included in the visual scene in response to changes in said processing load.

* * * * *